(12) United States Patent
Lee et al.

(10) Patent No.: US 11,668,860 B2
(45) Date of Patent: Jun. 6, 2023

(54) MICRO-LENS ARRAY AND METHOD OF MANUFACTURING THE SAME

(71) Applicant: LG Electronics Inc., Seoul (KR)

(72) Inventors: Jongmoo Lee, Seoul (KR); Eunyoung Kim, Seoul (KR); Sejoon You, Seoul (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 17/035,237

(22) Filed: Sep. 28, 2020

(65) Prior Publication Data

US 2021/0033753 A1    Feb. 4, 2021

Related U.S. Application Data

(63) Continuation of application No. PCT/KR2019/009441, filed on Jul. 29, 2019.

(51) Int. Cl.
   *G02B 3/00*    (2006.01)
(52) U.S. Cl.
   CPC ......... *G02B 3/0068* (2013.01); *G02B 3/0012* (2013.01)
(58) Field of Classification Search
   CPC .................... G02B 3/0068; G02B 3/0012
   See application file for complete search history.

(56) References Cited

U.S. PATENT DOCUMENTS

| 8,194,323 | B2 * | 6/2012 | Okazaki ............... G02B 3/0012 359/619 |
| 8,456,743 | B2 | 6/2013 | Okazaki et al. |
| 2008/0123199 | A1 | 5/2008 | Hong |

FOREIGN PATENT DOCUMENTS

| JP | 2008152040 | 7/2008 |
| JP | 4888241 | 2/2012 |
| KR | 1020100055023 | 5/2012 |

* cited by examiner

*Primary Examiner* — Robert E. Tallman
(74) *Attorney, Agent, or Firm* — Fish & Richardson P.C.

(57) ABSTRACT

A micro-lens array includes a shutter bezel substrate, a first lens substrate having a first inner surface in contact with a first surface of the shutter bezel substrate, a first lens array disposed at a first outer surface of the first lens substrate that is opposite to the first inner surface of the first lens substrate, a second lens substrate having a second inner surface in contact with a second surface of the shutter bezel substrate, and a second lens array disposed at a second outer surface of the second lens substrate that is opposite to the second inner surface of the second lens substrate. At least one of the first lens substrate or the second lens substrate includes an alignment mark that is configured to guide placement of the first lens array on the first lens substrate and the second lens array on the second lens substrate.

13 Claims, 4 Drawing Sheets

MICRO-LENS ARRAY AND METHOD OF MANUFACTURING THE SAME

CROSS-REFERENCE TO RELATED APPLICATION

This application is a continuation of International Application No. PCT/KR2019/009441, filed on Jul. 29, 2019, the disclosure of which is incorporated by reference in its entirety.

FIELD

The present disclosure relates to a micro-lens array capable of defining a light distribution pattern and a method of manufacturing the same.

BACKGROUND

A vehicle may include various types of vehicle lamps having a lighting function for facilitating articles or objects near the vehicle to be recognized, and a signaling function for notifying a driving state of the vehicle to other vehicles or pedestrians.

For example, headlights (headlamps) and fog lights (fog lamps) may perform lighting functions, and turn indicator lights (lamps), tail lights (tail lamps), brake lamps, side markers, etc. may perform signal functions.

In some cases, the lamps for the vehicle may be subject to regulations such as installation criteria and standards of the lamps for the vehicle. For instance, vehicle lamps may be required to form a beam pattern having a predetermined cut-off line depending on uses.

In some examples, headlights (or headlamps) may emit high beams that shine far ahead to ensure visibility, and low beams that shine low and may not cause blinding light to reach a driver of a preceding vehicle and a driver of a vehicle coming from an opposite side. In the case of low beams, light irradiation over the cut-off line may be blocked to avoid directing light to a driver of a preceding vehicle.

In some cases, a vehicle may include an adaptive front lighting system configured to convert a light distribution pattern according to the driving state of the vehicle. For example, the adaptive front lighting system may provide an optimal driving environment according to a driving state of a vehicle, for example, driving speed, a driving direction, a road surface condition, ambient brightness, and the like, by using headlights for the vehicle.

In some cases, the adaptive front lighting system may adaptively convert a light distribution pattern according to a driving state of a vehicle by varying a light distribution pattern of light emitted from a light source.

This adaptive front lighting system may adaptively convert a light distribution pattern(s) of low beams and/or high beams. For example, the light distribution pattern of the low beams may be converted based on driving information related to the vehicle, and the light distribution pattern of the high beams may be converted based on an object located at the front, for example, a vehicle coming from an opposite direction.

Various light distribution patterns may be implemented by partially blocking light emitted from a light source using a shield. In some cases, the shield may adjust a direction in which the light is blocked and a degree to which light is blocked. In some cases, the shield may enable a limited light distribution pattern due to a structural limitation of the shield. For example, an overall configuration of vehicle lamps may become complicated, and manufacturing costs may increase.

SUMMARY

The present disclosure describes a manufacturing method and structure that may reduce a manufacturing time of a micro-lens array.

According to one aspect of the subject matter described in this application, a micro-lens array includes a shutter bezel substrate including a photoresist layer attached to at least one surface of the shutter bezel substrate, a first lens substrate having a first inner surface in contact with a first surface of the shutter bezel substrate, a first lens array disposed at a first outer surface of the first lens substrate that is opposite to the first inner surface of the first lens substrate, a second lens substrate having a second inner surface in contact with a second surface of the shutter bezel substrate, and a second lens array disposed at a second outer surface of the second lens substrate that is opposite to the second inner surface of the second lens substrate. At least one of the first lens substrate or the second lens substrate includes an alignment mark that is configured to guide placement of the first lens array on the first lens substrate and the second lens array on the second lens substrate.

Implementations according to this aspect may include one or more of the following features. For example, the alignment mark may be defined on the first lens substrate among the shutter bezel substrate, the first lens substrate, and the second lens substrate. In some examples, the shutter bezel substrate may include a first region coated with the photoresist layer and a second region that is not coated with the photoresist layer, where the alignment mark overlaps with the second region of the shutter bezel substrate.

In some implementations, the alignment mark may be defined on the first lens substrate and the second lens substrate among the shutter bezel substrate, the first lens substrate, and the second lens substrate. In some examples, the alignment mark may overlap with the photoresist layer. In some examples, a thickness of the micro-lens array decreases toward an edge of the micro-lens array.

In some implementations, the micro-lens array may include a first bonding layer disposed between the first surface of the first lens substrate and the first surface of the shutter bezel substrate, and a second bonding layer disposed between the first surface of the second lens substrate and the second surface of the shutter bezel substrate. The photoresist layer may include a first photoresist layer that is coated on the first surface of the shutter bezel substrate and contacts the first bonding layer, and a second photoresist layer that is coated on the second surface of the shutter bezel substrate and contacts the second bonding layer.

In some implementations, the alignment mark may be configured to indicate a relative position of the first lens substrate or the second lens substrate with respect to a stamp substrate having a predetermine pattern corresponding to the first lens array or the second lens array.

According to another aspect, a method for manufacturing a micro-lens array includes bonding a first lens substrate to a first surface of a shutter bezel substrate, where the shutter bezel substrate includes a photoresist layer coated on at least one surface of the shutter bezel substrate, defining a plurality of cutting lines at the shutter bezel substrate, bonding a second lens substrate to a second surface of the shutter bezel substrate to thereby create a substrate assembly, cutting the substrate assembly along the plurality of cutting lines to thereby create a plurality of substrate assemblies, and defining lens arrays on both surfaces of each of the plurality of substrate assemblies based on an alignment mark that is disposed at least one of the first lens substrate or the second lens substrate.

Implementations according to this aspect may include one or more of the following features. For example, defining the lens arrays may include coating a light-transmitting resin on a stamp substrate that has a predetermined pattern, aligning the stamp substrate with one of the plurality of substrate assemblies based on the alignment mark, where the predetermined pattern faces the one of the plurality of substrate assemblies, based on alignment of the stamp substrate with the one of the plurality of substrate assemblies, bringing the stamp substrate in contact with the one of the plurality of substrate assemblies, and curing the light-transmitting resin in a state in which the stamp substrate is in contact with the one of the plurality of substrate assemblies.

In some implementations, curing the light-transmitting resin may include irradiating light having a predetermined wavelength range, where the stamp substrate is made of a light-transmitting material. In some examples, defining the plurality of cutting lines may include defining a plurality of holes on the shutter bezel substrate, where the plurality of holes may be spaced apart from one another by predetermined intervals. In some examples, irradiating the light may be performed through the stamp substrate in contact with the one of the plurality of substrate assemblies.

In some implementations, defining the lens arrays may include stamping a first lens array on a first outer surface of one of the plurality of substrate assemblies based on the alignment mark, where the first outer surface faces opposite to the first surface of the shutter bezel substrate, and stamping a second lens array on a second outer surface of the one of the plurality of substrate assemblies, where the second outer surface faces opposite to the second surface of the shutter bezel substrate.

In some examples, stamping the first lens array may include coating a light-transmitting resin on a stamp substrate that has a predetermined pattern, aligning the stamp substrate with the one of the plurality of substrate assemblies based on the alignment mark, where the predetermined pattern faces the first outer surface of the one of the plurality of substrate assemblies, based on alignment of the stamp substrate with the one of the plurality of substrate assemblies, contacting the stamp substrate with the first outer surface of the one of the plurality of substrate assemblies, and curing the light-transmitting resin in a state in which the stamp substrate is in contact with the first outer surface of the one of the plurality of substrate assemblies.

In some implementations, stamping the first lens array may include based on the light-transmitting resin being cured, detaching the stamp substrate from the first outer surface of the one of the plurality of substrate assemblies, the cured light-transmitting resin corresponding to the first lens array. In some examples, coating the light-transmitting resin on the stamp substrate may include filling in grooves of the predetermined pattern with the light-transmitting resin.

In some implementations, bonding the first lens substrate to the first surface of the shutter bezel substrate may include attaching a first bonding layer to a first photoresist layer coated on the first surface of the shutter bezel substrate, and brining the first lens substrate into contact with the first bonding layer. In some examples, bonding the second lens substrate to the second surface of the shutter bezel substrate may include attaching a second bonding layer to a second photoresist layer coated on the second surface of the shutter bezel substrate, and brining the second lens substrate into contact with the second bonding layer.

In some implementations, the photoresist layer may include a pattern configured to transmit light to define a light distribution pattern.

In some implementations, after stacking a plurality of substrates, the stacked substrates may be cut even by physical force, which may allow a plurality of substrate assemblies to be produced in a short time. Accordingly, the number of times performing substrate alignment for manufacturing substrate assemblies may be minimized. This may result in reduction of a manufacturing time of a micro-lens array.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated.

Prior to describing a micro-lens array according to the present disclosure, a method of manufacturing a micro-lens array in related art will be described.

Figure 1:
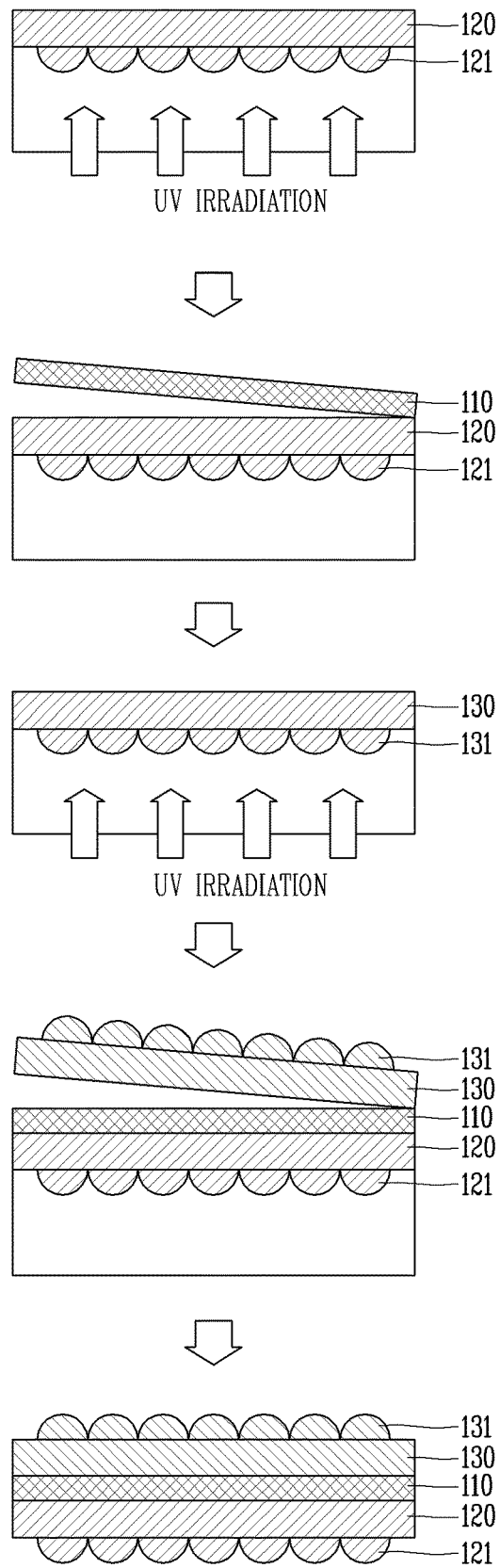
FIG. 1 is a conceptual view illustrating an example of a method of manufacturing a micro-lens array in related art.

FIG. 1 is a conceptual view illustrating an example of a method of manufacturing a micro-lens array in related art.

First, a step of cutting three types of substrates to a desired size is performed. Here, the three types of substrates are first and second lens substrates and a shutter bezel substrate. Each of the substrates may be manufactured by cutting a mother substrate.

The three substrates may be manufactured separately without being bonded to one another. Afterwards, as illustrated in FIG. 1, light-transmitting resin 121 may be coated on a stamp substrate with a predetermined pattern and then the first lens substrate 120 is brought into contact with the stamp substrate.

The stamp substrate may include a predetermined pattern formed in an engraving manner. The light-transmitting resin 122 may be filled in the engraved pattern. Thereafter, the light-transmitting resin 121 may be cured through UV irradiation. The light-transmitting resin 121 may be fixed onto the first lens substrate 120 accordingly. Through this process, a lens array may be formed on one surface of the first lens substrate.

In some cases, in order to facilitate the cured light-transmitting resin to be separated from the stamp substrate, the stamp substrate may be made of a material with low surface energy with the light-transmitting resin.

In some cases, during the formation of the lens array, the first lens substrate and the stamp substrate may be aligned with each other (first alignment). The first lens substrate is aligned to overlap the pattern formed on the stamp substrate by using an alignment mark formed thereon.

Afterwards, the shutter bezel substrate 110 may be bonded on a surface without the lens array, of both surfaces of the first lens substrate 120. The shutter bezel substrate 110 is a substrate including a photoresist layer on at least one surface thereof. The photoresist layer is a layer which allows light incident thereon to be transmitted only in a predetermined pattern. That is, the photoresist layer is a layer which can define a predetermined light distribution pattern.

While the first lens substrate 120 and the shutter bezel substrate 110 are bonded to each other, the first lens substrate 120 and the shutter bezel substrate 110 are aligned with each other (second alignment). In this instance, the two substrates are bonded to each other after alignment marks formed on the first lens substrate 120 and the shutter bezel substrate 110, respectively, are aligned in an overlapping manner.

Next, after a light-transmitting resin 131 is coated on a stamp substrate with a predetermined pattern, the second lens substrate 130 is brought into contact with the stamp substrate. The stamp substrate has a predetermined pattern formed in an engraving manner. The light-transmitting resin 131 has to be filled in the engraved pattern. Thereafter, the light-transmitting resin 131 is cured through UV irradiation. The light-transmitting resin 131 is fixed onto the second lens substrate 130 accordingly. Through this process, a lens array is formed on one surface of the second lens substrate 130.

In some examples, during the formation of the lens array, the second lens substrate 130 and the stamp substrate may be aligned with each other (third alignment). The second lens substrate 130 is aligned to overlap a pattern formed on the stamp substrate by using an alignment mark formed thereon.

Afterwards, the second lens substrate 130 may be bonded to the shutter bezel substrate 110. In this instance, the second lens substrate 130 is bonded to a surface without contact with the first lens substrate 120, of both surfaces of the shutter bezel substrate 110.

While the second lens substrate 130 and the shutter bezel substrate 110 are bonded to each other, the second lens substrate 130 and the shutter bezel substrate 110 may be aligned with each other (fourth alignment). In this instance, the two substrates may be bonded to each other after alignment marks formed on the second lens substrate 130 and the shutter bezel substrate 110, respectively, are aligned in an overlapping manner.

As aforementioned, according to the related art method, totally four times of alignment may be carried out to manufacture one micro-lens array, and all the substrates included in the micro-lens array may be provided with the alignment marks, respectively.

The present disclosure provides a method capable of shortening a manufacturing time of a micro-lens array by minimizing the number of times performing alignment. Prior to describing a manufacturing method according to the present disclosure, a structure of a micro-lens array according to the present disclosure will be described.

Figure 2:
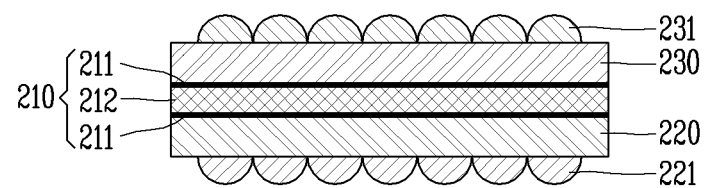
FIG. 2 is a cross-sectional view illustrating an example of a micro-lens array in accordance with the present disclosure.
Figure 3:
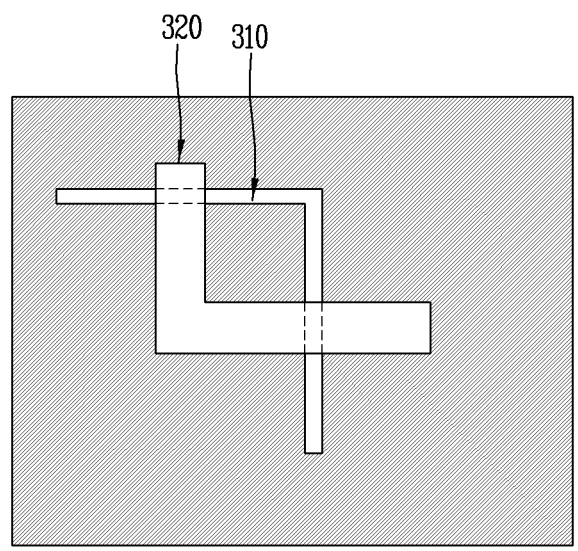
FIG. 3 is a conceptual view illustrating example alignment marks of a micro-lens array.

FIG. 2 is a cross-sectional view of an example of a micro-lens array in accordance with the present disclosure, and FIG. 3 is a conceptual view illustrating an example of an alignment mark defined at the micro-lens array.

In some implementations, a micro-lens array according to the present disclosure may include a shutter bezel substrate 210, a first lens substrate 220, a first lens array 221, a second lens substrate 230, and a second lens array 231. In some examples, bonding layers for bonding those substrates described above may be provided between adjacent substrates but they are not illustrated in FIG. 2.

In some implementations, at least one photoresist layer 211 may be coated on the shutter bezel substrate 210. The photoresist layer 211 may be made of black ink absorbing light, and defines a predetermined pattern. Light incident on the photoresist layer 211 is partially absorbed and partially passes through the pattern. In some examples, the photoresist layer 211 may include a predetermined form or pattern and transmit incident light according to the predetermined form or pattern. A light distribution pattern may vary depending on the pattern formed on the photoresist layer 211.

In some examples, the photoresist layer 211 may be coated on a light-transmitting substrate 212. The light-transmitting substrate 212 serves to support the photoresist layer 211. The light-transmitting substrate 212 may be made of a material with high light-transmittance which may not affect optimal transmittance of the micro-lens array. For example, the light-transmitting substrate 212 may be made of glass with a thickness of 1.0 to 1.2 mm.

The first and second lens substrates 220 and 230 may serve to fix lens arrays to be explained later. The first and second lens substrates 220 and 230 may be made of a material with high light-transmittance which may not affect optimal transmittance of the micro-lens array. For example, the first and second lens substrates 220 and 230 may be made of glass with a thickness of 1.5 to 2.5 mm.

The first and second lens substrates 220 and 230 may be disposed on both surfaces of the shutter bezel substrate 210, respectively.

The first lens array 221 may be disposed on another surface, which is different from one surface brought into contact with the shutter bezel substrate 210, of both surfaces of the first lens substrate 220. Also, the second lens array 231 may be disposed on another surface, which is different from one surface brought into contact with the shutter bezel substrate 210, of both surfaces of the second lens substrate 230.

The first and second lens arrays 221 and 231 may be configured to concentrate light to a constant direction or form parallel light. The first and second lens arrays 221 and 231 may be made of a material with high light-transmittance which may not affect optimal transmittance of the micro-lens array. Also, the first and second lens arrays 221 and 231 may be made of photocurable resin or thermosetting resin. For example, the first and second lens arrays 221 and 231 may be made of photocurable epoxy resin with a thickness of 0.6 to 0.8 mm.

In some implementations, at least one of the first and second lens substrates 220 and 230 may include an alignment mark. The alignment mark may be used for aligning at least two substrates to a desired relative position.

Referring to FIG. 3, one of two substrates to be aligned with each other may be provided with an alignment mark 310 in a shape like a rotated "L" shape, and the other substrate may be provided with an alignment mark 320 in an "L" shape. The two substrates may be aligned with each other by moving at least one of the two substrates in a manner that the two alignment marks cross each other as illustrated in FIG. 3.

In some examples, the alignment mark may be defined only on the first lens substrate 220 among the shutter bezel substrate 210, the first lens substrate 220, and the second lens substrate 230. In some examples, the alignment mark may be defined only on the first and second lens substrates 220 and 230. In some examples, the shutter bezel substrate 210 may not include any alignment mark. Alignment marks will be described in more detail in relation to a manufacturing method to be explained later.

Hereinafter, a method of manufacturing a micro-lens array according to the present disclosure will be described.

Figure 4:
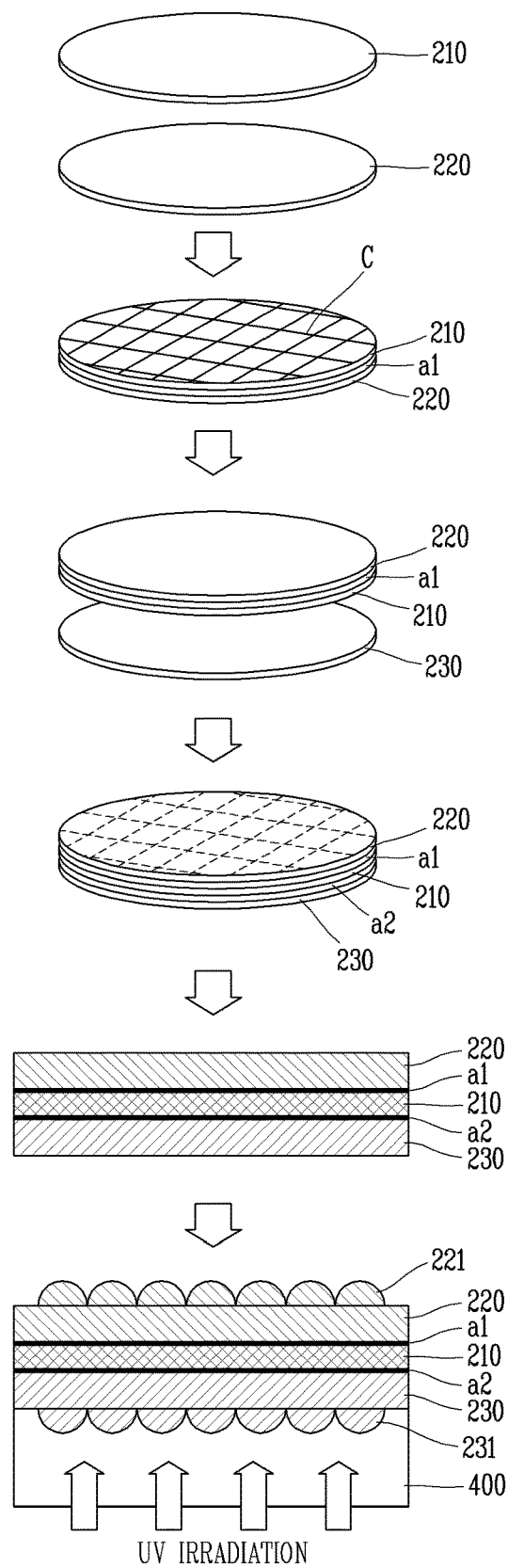
FIGS. 4 and 5 are conceptual views illustrating an example of a method of manufacturing a micro-lens array in accordance with the present disclosure.
Figure 5:
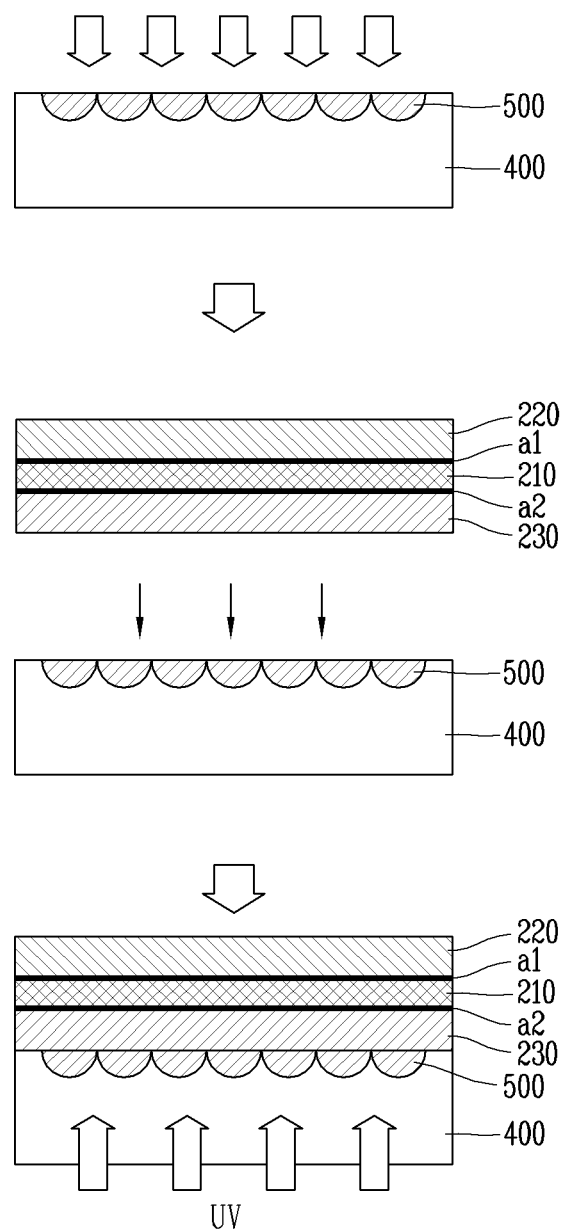

FIGS. 4 and 5 are conceptual views illustrating an example of a method of manufacturing a micro-lens array according to the present disclosure.

As illustrated in those drawings, first, the first lens substrate 220 is bonded to one of both surfaces of the shutter bezel substrate 210. Accordingly, a bonding layer a1 may be formed between the shutter bezel substrate 210 and the first lens substrate 220.

Cutting lines C may be then formed on the shutter bezel substrate 210. The formation of the cutting lines may be carried out by forming holes on the shutter bezel substrate at predetermined intervals. In some implementations, the holes may be formed by a laser. In some examples, without being limited to this, the cutting lines may be formed by a scriber.

Afterwards, the second lens substrate 230 may be bonded to another surface of the both surfaces of the shutter bezel substrate 210, so as to form a substrate assembly. The substrate assembly is in a state where three mother substrates are bonded together, and thus a plurality of substrate assemblies may be manufactured from the substrate assembly through a cutting process. Therefore, a bonding layer a2 may be formed between the shutter bezel substrate 210 and the second lens substrate 230.

The substrate assembly is configured as the three substrates overlap together, and is considerably thick in thickness. For example, considering a thickness of the shutter bezel substrate and a thickness of each of the first and second lens substrates, the thickness of the substrate assembly is in the range of 4.0 to 6.2 mm even if the bonding layers are ignored.

The large thickness of the substrate assembly limits the manufacture of the plurality of substrate assemblies in the manner of cutting the substrate assembly. As a result, in the related art, a substrate assembly was manufactured by cutting three mother substrates, respectively, and bonding the cut substrates. This resulted in spending an excessively long time to align those substrates.

The present disclosure minimizes such alignment time of substrates by cutting a substrate assembly that three mother substrates overlap one another. The formation of the cutting lines is carried out in order to facilitate the cutting of the substrate assembly that the three mother substrates overlap one another. When the cutting lines are formed, the substrate assembly can be cut in a laser cutting manner or by a scriber.

As aforementioned, the present disclosure forms the cutting lines inside the substrate assembly to facilitate the cutting of the substrate assembly. By overlapping the three mother substrates and cutting them, it is not necessary to perform two times of substrate alignment every time when manufacturing the substrate assembly, like the related art method. According to the present disclosure, the plurality of substrate assemblies can be manufactured by performing the substrate alignment only two times.

For example, in the case of producing ten substrates by cutting one mother substrate, ten substrate assemblies may be obtained by performing the substrate alignment totally 20 times in the related art while performing the substrate alignment totally two times in the present disclosure.

In some examples, prior to cutting the substrate assembly, a secondary cutting line formation may be carried out on at least one of the first and second lens substrates. The secondary cutting line formation may be performed by using a scriber or in a laser cutting manner.

In some implementations, the alignment mark for aligning the shutter bezel substrate 210 and the first lens substrate 220 and the alignment mark for aligning the shutter bezel substrate 210 and the second lens substrate 230 prior to cutting the substrate assembly may disappear after cutting the substrate assembly. Accordingly, no alignment mark may be formed on the shutter bezel substrate 210 provided in the micro-lens array.

In some examples, the thickness of the micro-lens array may decrease gradually toward an edge of the micro-lens array according to the cutting process.

Afterwards, lens arrays may be placed on both surfaces of the cut substrate assembly.

Hereinafter, the step of forming the lens arrays will be described in detail with reference to FIG. 5.

Referring to FIG. 5, a light-transmitting resin 221 is coated on a stamp substrate with a predetermined pattern.

Afterwards, the first lens substrate 220 is aligned to overlap the pattern formed on the stamp substrate 400, by using the alignment mark formed on the first lens substrate 220.

In order to use an alignment mark to align two substrates, light-transmittance of a predetermined level or more may be secured for a path starting from one point to an alignment mark formed on another substrate via an alignment mark formed one substrate.

In some examples, when observing overlapped two substrates in one direction after overlapping them, positions of two alignment marks may be visible. For example, the observation may be made by naked eyes or an optical system. Accordingly, light-transmittance may be secured as high as being observed by the naked eyes or the optical system, for the path starting from an observation point to the alignment mark formed on another substrate via the alignment mark formed on the one substrate.

When the first lens substrate 220 and the stamp substrate 400 are aligned with each other, it may be visible that the alignment marks formed on the first lens substrate 220 and the stamp substrate 400 overlap each other.

In some implementations, the stamp substrate 400 may be made of a light-transmitting material. In some examples, where a photoresist layer is formed on a central portion of a substrate assembly, the alignment marks may be invisible when the first lens substrate 220 is observed in a direction of the second lens substrate 230. Therefore, the alignment marks formed on the first lens substrate 220 and the stamp substrate 400 may be observed below the stamp substrate 400.

Similarly, when a second lens array is formed on the second lens substrate 230, the alignment mark formed on the second lens substrate 230 may be aligned with the alignment mark formed on the stamp substrate 400.

In some implementations, an alignment mark may be formed only on the first lens substrate 220. In this case, when aligning the second lens substrate 230 with the stamp substrate 400, the alignment mark formed on the first lens substrate 220 may be used. In some examples, the shutter bezel substrate 220 may include a first region coated with a photoresist layer and a second region without being coated with the photoresist layer, and the alignment mark may be formed to overlap the second region. Accordingly, the alignment mark formed on the first lens substrate 220 may be observed above and below a substrate assembly, respectively. Therefore, the present disclosure can use the alignment mark formed on the first lens substrate 220 for aligning the second lens substrate 230 and the stamp substrate 400. For instance, a photoresist may be present at only a portion of a surface of the shutter bezel substrate 220 inside the first region, and the second region may be another portion of the surface of the shutter bezel substrate 220 that is outside the first region.

The first lens substrate 220 or the second lens substrate 230 may be aligned with the stamp substrate 400 and then brought into contact with the stamp substrate 400. Afterwards, a resin coated on the stamp substrate 400 is cured. In some examples, the resin may be a photocurable resin, and the stamp substrate 400 may be made of a light-transmitting material for photocuring.

In some implementations, after stacking a plurality of substrates, the stacked substrates may be cut by physical force, which may allow a plurality of substrate assemblies to be produced in a short time. Accordingly, the number of times of substrate alignment for manufacturing substrate assemblies may be reduced. This may result in reduction of a manufacturing time of a micro-lens array.

What is claimed is:

1. A method for manufacturing a micro-lens array, the method comprising:
   bonding a first lens substrate to a first surface of a shutter bezel substrate, the shutter bezel substrate comprising a photoresist layer coated on at least one surface of the shutter bezel substrate;
   defining a plurality of cutting lines at the shutter bezel substrate;
   after defining the plurality of cutting lines at the shutter bezel substrate, bonding a second lens substrate to a second surface of the shutter bezel substrate to thereby create a substrate assembly;
   cutting the substrate assembly along the plurality of cutting lines to thereby create a plurality of substrate assemblies; and
   defining lens arrays on both surfaces of each of the plurality of substrate assemblies based on an alignment mark that is disposed at least one of the first lens substrate or the second lens substrate,
   wherein defining the plurality of cutting lines comprises defining a plurality of holes on the shutter bezel substrate before creating the substrate assembly, the plurality of holes being spaced apart from one another by predetermined intervals.

2. The method of claim 1, wherein defining the lens arrays comprises:
   coating a light-transmitting resin on a stamp substrate that has a predetermined pattern;
   aligning the stamp substrate with one of the plurality of substrate assemblies based on the alignment mark, the predetermined pattern facing the one of the plurality of substrate assemblies;
   based on alignment of the stamp substrate with the one of the plurality of substrate assemblies, bringing the stamp substrate in contact with the one of the plurality of substrate assemblies; and
   curing the light-transmitting resin in a state in which the stamp substrate is in contact with the one of the plurality of substrate assemblies.

3. The method of claim 2, wherein curing the light-transmitting resin comprises irradiating light having a predetermined wavelength range, and
   wherein the stamp substrate is made of a light-transmitting material.

4. The method of claim 3, wherein irradiating the light is performed through the stamp substrate in contact with the one of the plurality of substrate assemblies.

5. The method of claim 1, wherein defining the lens arrays comprises:
   stamping a first lens array on a first outer surface of one of the plurality of substrate assemblies based on the alignment mark, the first outer surface facing opposite to the first surface of the shutter bezel substrate; and
   stamping a second lens array on a second outer surface of the one of the plurality of substrate assemblies, the second outer surface facing opposite to the second surface of the shutter bezel substrate.

6. The method of claim 5, wherein stamping the first lens array comprises:
   coating a light-transmitting resin on a stamp substrate that has a predetermined pattern;
   aligning the stamp substrate with the one of the plurality of substrate assemblies based on the alignment mark, the predetermined pattern facing the first outer surface of the one of the plurality of substrate assemblies;
   based on alignment of the stamp substrate with the one of the plurality of substrate assemblies, contacting the stamp substrate with the first outer surface of the one of the plurality of substrate assemblies; and
   curing the light-transmitting resin in a state in which the stamp substrate is in contact with the first outer surface of the one of the plurality of substrate assemblies.

7. The method of claim 6, wherein stamping the first lens array further comprises:
   based on the light-transmitting resin being cured, detaching the stamp substrate from the first outer surface of the one of the plurality of substrate assemblies, the cured light-transmitting resin corresponding to the first lens array.

8. The method of claim 6, wherein coating the light-transmitting resin on the stamp substrate comprises filling in grooves of the predetermined pattern with the light-transmitting resin.

9. The method of claim 1, wherein bonding the first lens substrate to the first surface of the shutter bezel substrate comprises:
   attaching a first bonding layer to a first photoresist layer coated on the first surface of the shutter bezel substrate; and
   brining the first lens substrate into contact with the first bonding layer.

10. The method of claim 9, wherein bonding the second lens substrate to the second surface of the shutter bezel substrate comprises:
    attaching a second bonding layer to a second photoresist layer coated on the second surface of the shutter bezel substrate; and
    brining the second lens substrate into contact with the second bonding layer.

11. The method of claim 1, wherein the plurality of holes are defined through the second surface of the shutter bezel substrate by a laser.

12. The method of claim 1, wherein the plurality of cutting lines are defined on the second surface of the shutter bezel substrate by a scriber.

13. The method of claim 1, wherein the plurality of cutting lines are defined after the first lens substrate is bonded to the first surface of the shutter bezel substrate.

* * * * *